(12) United States Patent
Yablochnikov et al.

(10) Patent No.: US 8,899,084 B2
(45) Date of Patent: Dec. 2, 2014

(54) MAGNETIC PULSE WELDING AND FORMING FOR PLATES

(71) Applicant: Dana Automotive Systems Group, LLC, Maumee, OH (US)

(72) Inventors: Boris A. Yablochnikov, Toledo, OH (US); Eve S. Steigerwalt, Nashville, TN (US); Tom O'Neil, Holland, OH (US); Jack A. Kummerow, Big Sandy, TN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 119 days.

(21) Appl. No.: 13/647,421

(22) Filed: Oct. 9, 2012

(65) Prior Publication Data

US 2013/0086961 A1    Apr. 11, 2013

Related U.S. Application Data

(60) Provisional application No. 61/545,324, filed on Oct. 10, 2011.

(51) Int. Cl.
*B23K 20/08* (2006.01)
*B23K 20/06* (2006.01)

(52) U.S. Cl.
CPC ............ *B23K 20/06* (2013.01); *B23K 2201/38* (2013.01); *Y10S 72/707* (2013.01)
USPC ................... 72/56; 72/430; 72/707; 219/617; 29/419.2; 228/3.1; 228/115; 228/107

(58) Field of Classification Search
USPC ...... 72/54, 56, 60, 430, 707; 174/254, 117 E; 29/470.1, 491, 497.5, 419.2; 219/617, 219/603, 635; 228/3.1, 115, 234.1, 262.4
See application file for complete search history.

(56) References Cited

U.S. PATENT DOCUMENTS 3,140,539 A    7/1964  Holtzman
3,520,049 A *  7/1970  Dudin et al. ................... 219/617
(Continued)

FOREIGN PATENT DOCUMENTS

DE    102010052457 A1    5/2012
EP       1 935 551 A1    6/2008
(Continued)

OTHER PUBLICATIONS

S.D. Kore, P.P. Date, S.V. Kulkarni, S. Kumar, M.R. Kulkarni, S.V. Desai, R.K. Rajawat, K.V. Nagesh, D.P. Chakravarty; "Electromagnetic Impact Welding of Al-to-Al-Li Sheets", Journal of Manufacturing Science and Engineering, Jun. 2009, 034502-1-4, vol. 131, Copyright 2009 by ASME.

(Continued)

*Primary Examiner* — David B Jones
(74) *Attorney, Agent, or Firm* — Marshall & Melhorn, LLC

(57) ABSTRACT

A method of welding two workpieces together is described. A conductor in electrical communication with a pulse circuit is provided. A portion of the second workpiece is located adjacent the conductor. The two workpieces are also located together. A portion, or all, of one workpiece is welded to the other by applying a pulse current to one of the workpieces. A method of forming a workpiece is disclosed using a pulse current to move the workpiece into a desired shape.

27 Claims, 10 Drawing Sheets

(56) References Cited

U.S. PATENT DOCUMENTS

| | | | |
|---|---|---|---|
| 3,591,757 A | 7/1971 | Rudd | |
| 3,794,805 A | 2/1974 | Rudd | |
| 3,851,139 A | 11/1974 | Rudd | |
| 3,947,290 A | 3/1976 | Matter | |
| 4,055,291 A | 10/1977 | Peters | |
| 4,234,776 A | 11/1980 | Rudd | |
| 4,916,278 A | 4/1990 | Rudd | |
| 6,255,631 B1 * | 7/2001 | Kichline et al. | 219/617 |
| 6,340,053 B1 | 1/2002 | Wu | |
| 6,513,240 B1 | 2/2003 | Seidel | |
| 6,523,876 B1 | 2/2003 | Durand | |
| 6,531,688 B2 | 3/2003 | Yablochnikov | |
| 6,548,792 B1 * | 4/2003 | Durand | 219/617 |
| 6,561,722 B1 | 5/2003 | Dudko | |
| 6,772,934 B2 | 8/2004 | Banker | |
| 6,910,617 B2 | 6/2005 | Yablochnikov | |
| 7,076,981 B2 | 7/2006 | Bradley | |
| 7,959,057 B2 * | 6/2011 | Criqui | 228/115 |
| 2002/0097549 A1 | 7/2002 | Maletin | |
| 2005/0229377 A1 * | 10/2005 | Bradley et al. | 29/509 |
| 2006/0131300 A1 | 6/2006 | Yablochnikov | |
| 2006/0156776 A1 | 7/2006 | Yablochnikov | |
| 2008/0120844 A1 * | 5/2008 | Yang et al. | 29/897.2 |
| 2010/0059254 A1 | 3/2010 | Sugiyama et al. | |
| 2010/0140328 A1 | 6/2010 | Olsson | |

FOREIGN PATENT DOCUMENTS

| | | |
|---|---|---|
| JP | 53-131254 A | 11/1978 |
| JP | 55-86690 A | 6/1980 |
| JP | 64020985 U | 2/1989 |
| JP | 2000-11964 A | 1/2000 |
| JP | 2003-260569 A | 9/2003 |
| JP | 2004-34155 A | 2/2004 |
| JP | 2006-88172 A | 4/2006 |
| JP | 2006088172 A | 4/2006 |
| JP | 2010-110814 A | 5/2010 |
| JP | 2011-79036 A | 4/2011 |
| SU | 518898 | 11/1972 |
| WO | 2008104668 A1 | 9/2008 |

OTHER PUBLICATIONS

V. Shribman, "Magnetic Pulse Welding for Dissimilar and Similar Materials", Pulsar Ltd, Yavne, Israel, 3rd International Conference on High Speed Forming-2008; pp. 13-22.

J. Shang, L. Wilkerson, S. Hatkevich and G.S. Daehn, "Commercialization of Fuel Cell Bipolar Plate Manufacturing by Electromagnetic Forming", 4th International Conference on High Speed Forming—2010; pp. 47-56.

Ralph Schafer, Pablo Pasquale, Material hybrid joining of sheet metals by electromagnetic pulse technology, pp. 1-8; PST products GmbH, Junkersstr. 163755 Alzenau, Germany; from www.pstproducts.com/index_htm_files/EMPT_sheetwelding_PSTproducts.pdf.

Machine Translation—WO2008104668A1—Lucien Weis, Sep. 4, 2008.

Machine Translation—JP2006088172A—Kumagai Masaki, Apr. 6, 2006.

English Translation—Inventor's Certificate No. 518898, Boris A. Yablochnikov, priority date of Nov. 21, 1972.

* cited by examiner

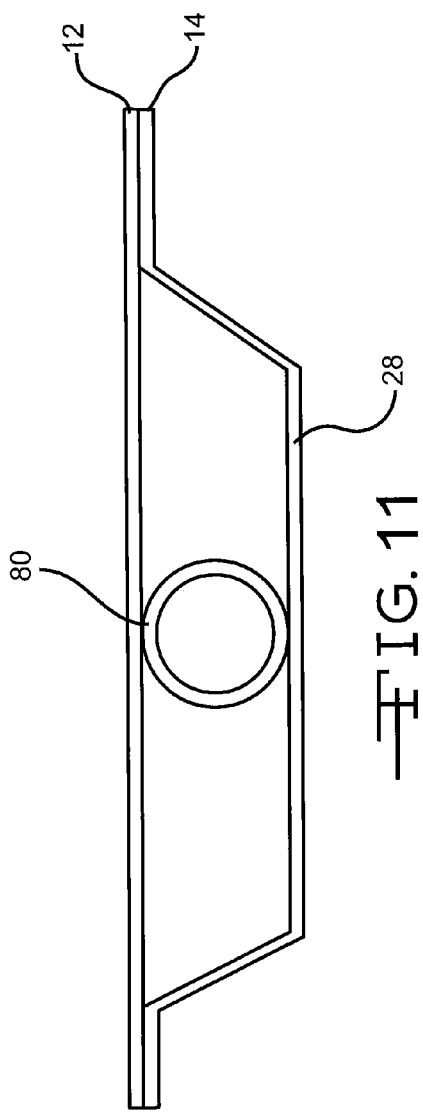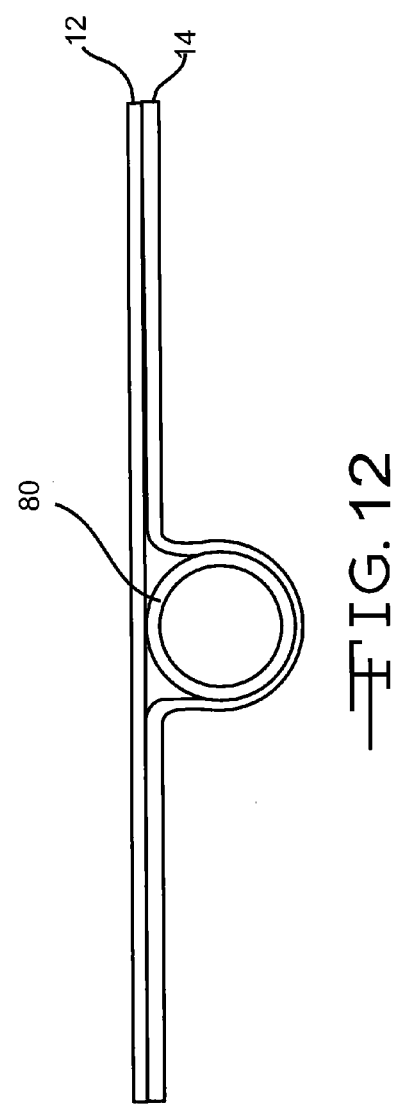

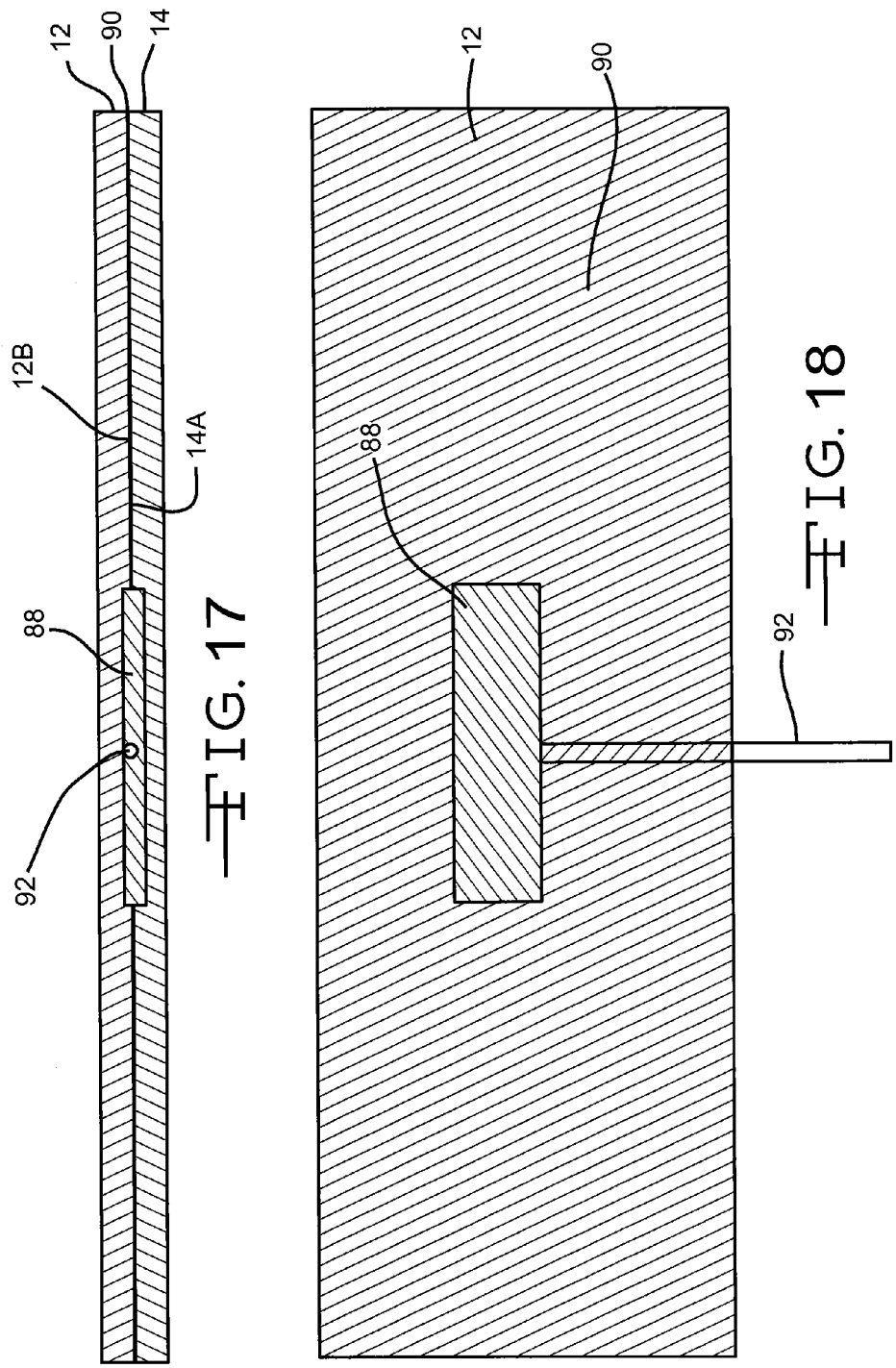

MAGNETIC PULSE WELDING AND FORMING FOR PLATES

RELATED APPLICATIONS

This application claims priority to U.S. patent application Ser. No. 61/545,324 filed on Oct. 10, 2011 which is incorporated by reference in its entirety.

FIELD OF THE INVENTION

The present invention relates to magnetic pulse welding and forming and more specifically to using magnetic pulse welding to couple plates, such as battery plates, or using magnetic pulse forming to form plates.

BACKGROUND OF THE INVENTION

There are a variety of methods for connecting plates together, such as plates for a battery. A common method of connecting the battery plates together is by welding. One type of welding that is used is ultrasonic welding. Ultrasonic welding is well-known, readily available and cost-effective, however, it has disadvantages, particularly for battery plates.

Often ultrasonic welding of battery plates results in significant deformation of one or more of the plates at the weld location when the weld is completed. This permanent deformation can damage or ruin the plates thus making them unusable or inefficient. Thus, a different method of connecting the plates together is needed that does not result in permanent damage to the connected plates.

There are also a variety of methods for forming plates, or portions of plates, into desired shapes. Presses and dies are frequently used but, depending on the desired shape, the cycle time to create the shape can be undesirable. Additionally, it can be difficult to create some shapes using presses/dies. Instead, it would be desirable to have a process for forming plates, or portions of plates, in a quick and accurate method.

SUMMARY OF THE INVENTION

A method of welding two workpieces together is provided. The method comprises providing a first workpiece and a second workpiece to be welded to the first. The second workpiece may have an embossed portion formed therein. A conductor is provided that is in electrical communication with a pulse circuit. Where an embossed portion of the second workpiece is provided, it is placed adjacent the conductor. The first workpiece is disposed against the second workpiece. A restraining member is located against one of the workpieces. A pulse current is applied to the second workpiece to weld it to the first workpiece.

A method for forming a portion of a workpiece is also disclosed using a pulse current. The method comprises providing a workpiece. The workpiece is located adjacent a conductor. The workpiece is also located adjacent a restraining member. The restraining member may have a desired shape formed therein. A pulse current is applied to the workpiece to form it against the restraining member shape.

BRIEF DESCRIPTION OF THE DRAWINGS

The above, as well as other advantages of the present invention, will become readily apparent to those skilled in the art from the following detailed description when considered in the light of the accompanying drawings in which:

FIG. 11 is a cut-away schematic side view of two plates and a structure in an initial orientation;

FIG. 12 is a cut-away schematic side view of the plates and structure of FIG. 11 in a subsequent orientation;

FIG. 17 depicts a cut-away schematic side view of another embodiment; and

FIG. 18 is a partial top view of the embodiment of FIG. 17.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
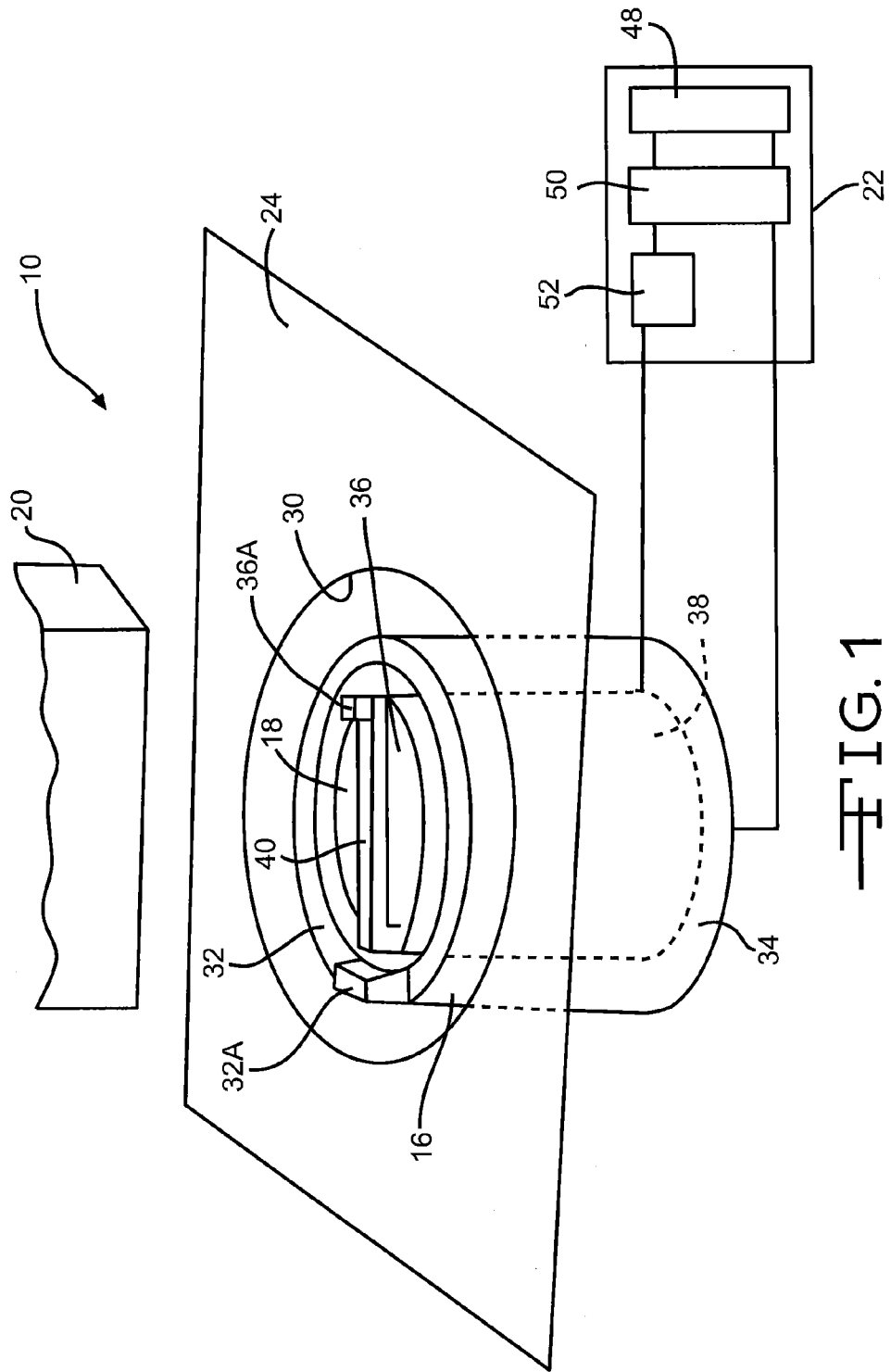
FIG. 1 is a schematic view of a pulse welding system.
Figure 2:
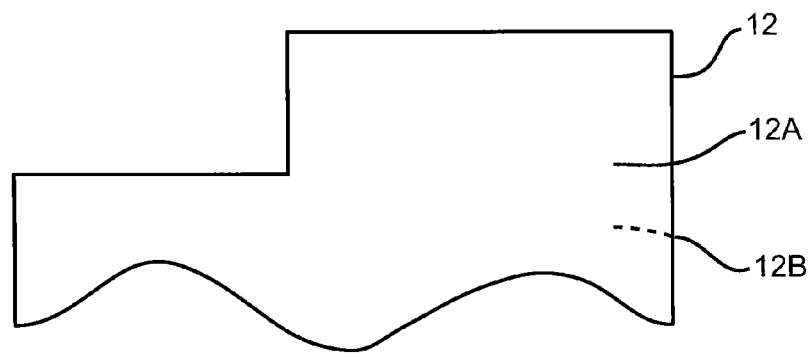
FIG. 2 is a top view of a partial first plate.

FIG. 1 illustrates a pulse welding system 10 for welding a first workpiece 12 (as shown in FIG. 2) to a second workpiece 14 (as shown in FIG. 2) according to one embodiment.

The pulse welding system 10 includes a first terminal 16, a proximity conductor 18, a restraining member 20, and a pulse circuit 22. As shown in FIG. 1, the first terminal 16 and the proximity conductor 18 can be mounted adjacent a work surface 24 and the restraining member 20 is movably mounted above the work surface 24. Alternately, the restraining member 20 may be movably mounted to the work surface 24 adjacent the first terminal 16 and the proximity conductor 18. The first terminal 16 and the proximity conductor 18 are in electrical communication with the pulse circuit 22.

While a work surface 24 is provided, the present invention works equally well without the surface. The work surface may support the components described herein, as suggested above, and/or it may function to house and enclose the components mentioned here as well as other components are not discussed.

As shown in FIG. 2, the first workpiece 12 is a portion of a first battery plate (partially shown); however, it is understood that the first workpiece 12 may be a portion of any other object. The first workpiece 12 is formed from metal such as an aluminum, or aluminum alloy, sheet metal or a copper, or copper alloy, sheet metal; however, it is understood that the first workpiece 12 may be formed from any other sheet metal. In one embodiment, the first workpiece 12 has a substantially rectangular shape and is substantially flat; however, it is understood the first workpiece 12 may be any other shape.

The first workpiece 12 may have a planar upper surface 12A and a planar lower surface 12B. The surfaces 12A, 12B may be separated from one another by a substantially constant thickness.

Figure 3:
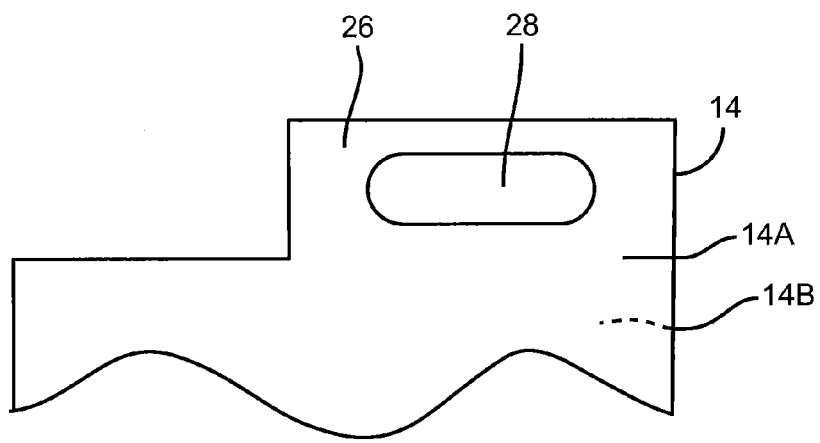
FIG. 3 is a top view of a partial second plate.

As shown in FIG. 3, the second workpiece 14 is a portion of a second battery plate (partially shown); however, it is understood that the second workpiece 14 may be a portion of any other object. The second workpiece 14 is formed from metal such as an aluminum, or aluminum alloy, sheet metal or a copper, or copper alloy, sheet metal; however, it is understood that the second workpiece 14 may be formed from any other sheet metal. In one embodiment, the second workpiece 14 has a substantially rectangular shape and comprises a substantially flat portion 26 and an embossed portion 28. Preferably, where the first workpiece 12 and the second workpiece 14 are formed from different metals, the second workpiece 14 has an electrical resistivity of a lower value than an electrical resistivity of the first workpiece 12.

The substantially flat portion 26 of the second workpiece 14 is a non-embossed portion of the second workpiece 14. As shown in FIG. 3, the substantially flat portion 26 surrounds the embossed portion 28; however, it is understood that the substantially flat portion 26 may be adjacent the embossed portion or the substantially flat portion 26 may partially surround the embossed portion 28.

Except for the embossed portion 28, the second workpiece 14 may have a planar upper surface 14A and a planar lower surface 14B. The surfaces 14A, 14B may be separated from one another by a substantially constant thickness.

The embossed portion 28 may be formed by stamping the second workpiece 14 between a male die and a female die. As shown in FIG. 3, the embossed portion 28 is defined by an obround symmetrical perimeter; however, it is understood that the embossed portion 28 may be any other shape, such as a wedge, a prism, a partial sphere, a partial ellipsoid, a frusto-pyramidal shape, or a frusto-conical shape. The embossed portion 28 extends downwardly from the flat portion 26 and may be hemispherical or partially hemispherical in cross-section. However, it is understood that a shape and volume of the embossed portion 28 may be configured to optimize one or both of a resulting weld joining the second workpiece 14 and the first workpiece 12 and a jetting action that occurs during the magnetic pulse welding process, both of which are described below.

Additionally, the term "embossed portion" may refer to a portion of the second workpiece 14 that is not in fact formed by embossing. Instead, the portion may be formed by any known method of displacing one portion of a plate from another. Such methods include, but are not limited to, punching, stamping, cold forming and/or pressing.

The work surface 24 is preferably formed from a non-conductive material; however, it is understood that any material may be used, where the work surface 24 is electrically insulated from at least one of the first terminal 16 and the proximity conductor 18. The work surface 24 is substantially planar and includes a terminal aperture 30 formed therethrough. As shown in FIG. 1, the terminal aperture 30 extends through the work surface 24. The work surface 24 may be a portion of a mobile unit, a portion of a fixed unit, a portion of an assembly line, or a portion of any object associated with the pulse welding system 10.

The first terminal 16 is a conductor disposed in the terminal aperture 30 of the work surface 24. The first terminal 16 may be rigidly mounted with respect to the work surface 24 using any conventional coupling means. As mentioned hereinabove, the first terminal 16 is preferably electrically insulated from the work surface 24.

The first terminal 16 may be a hollow cylinder and has a contact end 32 and a circuit end 34; however, it is understood the first terminal 16 may be any other shape, such as a rectangular elongate member. Preferably, the first terminal 16 is continuous and unitary from the contact end 32 to the circuit end 34.

Except as provided below, the contact end 32 is substantially planar and is spaced apart from the work surface 24. The circuit end 34 is configured to be in electrical communication with the pulse circuit 22.

The contact end 32 has a contact 32A. The contact 32A may be unitary with the contact end 32, or separately formed but attached thereto. The contact 32A may have the same width as the contact end 32 and extend along the contact end 32, as shown in FIG. 1, or it may have a different width.

The contact 32A preferably extends upwardly from the contact end 32. The contact 32A may be at any location along the contact end 32 and, while only one contact 32A is shown in the Figures, there may be more than one. As shown in FIG. 1, it is preferred that there is a single contact 32A and that the contact be opposite, or partially opposite, a proximity conductor contact, described below.

The proximity conductor 18 is disposed in the terminal aperture 30 of the work surface 24. Additionally, as shown in FIG. 1, the proximity conductor 18 is disposed within the first terminal 16. Preferably, the proximity conductor 18 is centered within the first terminal 16.

The proximity conductor 18 may be rigidly mounted with respect to the work surface 24 using any conventional coupling means. The proximity conductor 18 is electrically insulated from the first terminal 16 and the work surface 24. The proximity conductor 18 has a contact end 36, a circuit end 38, and a magnetic field generating portion 40.

The contact end 36 may be spaced apart from the work surface 24 and the circuit end 38. For example, there may be a gap of constant dimension between the contact end 36 and the work surface 24 or the gap may vary as it extends between the work surface 24 and the contact end 36.

The circuit end 38 is configured to be in electrical communication with the pulse circuit 22. Preferably, the proximity conductor 18 is unitarily formed, but it is understood the proximity conductor 18 may comprise a plurality of components in electrical communication with one another.

The magnetic field generating portion 40 and the contact end 36 extend at least partially to the circuit end 38 in an "L" shape; but it is understood the magnetic field generating portion 40 and the contact end 36 may form other shapes.

Figure 5:
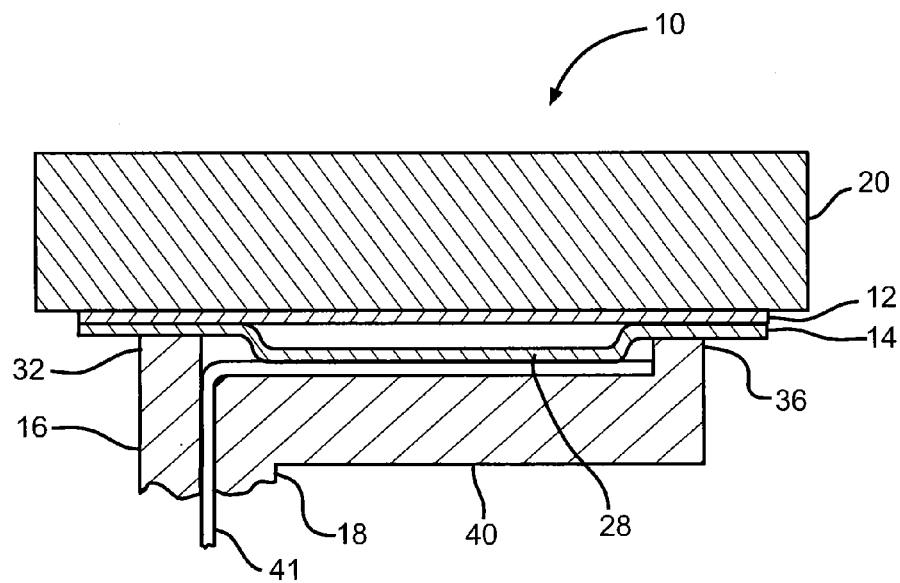
FIG. 5 is a cut-away schematic side view of the system.

Near the work surface 24, the contact end 36 may have a reverse S-shape, as shown in FIG. 5. The S-shape is defined by the proximity conductor 18, the magnetic field generating portion 40 and a contact 36A. Other shapes of these components are also permissible.

The magnetic field generating portion 40 extends transversely from the proximity conductor 18. In the preferred embodiment, the magnetic field generating portion 40 extends at approximately a 90 degree angle to the proximity conductor 18. The magnetic field generating portion 40 is cantilevered over the proximity conductor 18.

Opposite the connection of the magnetic field generating portion 40 to the proximity conductor 18, the contact 36A is located on the portion 40. The contact 36A may be unitary with the magnetic field generating portion 40, or separately formed but attached thereto.

The contact 36A preferably extends upwardly from the magnetic field generating portion 40. The contact 36A may be at any location along the magnetic field generating portion 40 and, while only one contact 36A is shown in the Figures, there may be more than one. As shown in FIG. 1, it is preferred that there is a single contact 36A and that the contact 36A be opposite, or partially opposite, the contact 32A.

Figure 4:
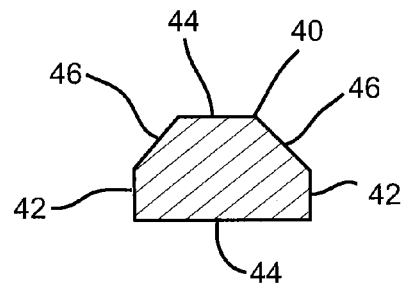
FIG. 4 is a cut-away schematic side view of one component of the system.

A preferred cross-sectional shape of the magnetic field generating portion 40, shown in FIG. 4, is a hexagonal prism having a first pair of parallel sides 42, a second pair of parallel sides 44, and a third pair of sides 46. The third pair of sides 46 form chamfers between the first pair of parallel sides 42 and one of the sides 44.

As shown in FIGS. 1 and 5, the restraining member 20 is an elongate member movably mounted adjacent the contact 32A of the first terminal 16, the magnetic field generating portion 40 of the proximity conductor 18, and the contact 36A of the proximity conductor 18. The restraining member 20 may be selectively mounted by one or more mechanical fasteners.

The restraining member 20 as shown in FIG. 1 is oriented parallel to the work surface 24; however, it is understood in certain applications that the restraining member 20 may be oriented obliquely to the work surface 24. An actuator (not shown) coupled to the restraining member 20 moves the restraining member 20 towards or away from the work surface 24, allowing the first workpiece 12 and the second workpiece 14 to be positioned therebetween, as shown in FIG. 5. Alternately, the restraining member 20 may be removably coupled to the work surface 24.

As shown schematically in FIG. 1, the pulse circuit 22 includes an inverter 48, a capacitor bank 50, and a high current switch 52. An input (not shown) of the inverter 48 is in electrical communication with an alternating current power supply (not shown). A direct current output (not shown) of the inverter 48 is in electrical communication with the capacitor bank 50 to charge the capacitor bank 50. The high current switch 52 is configured to provide electrical communication between a first terminal of the capacitor bank 50 and the circuit end 38 when the high current switch 52 is placed in a closed position. The circuit end 34 is in electrical communication with a second terminal (not shown) of the capacitor bank 50. Alternately, the high current switch 52 may be configured to provide electrical communication between a first terminal of the capacitor bank 50 and the circuit end 34 when the high current switch 52 is placed in a closed position and the circuit end 38 may be in electrical communication with a second terminal (not shown) of the capacitor bank 50.

In use, the pulse welding system 10 is used to couple the second workpiece 14 to the first workpiece 12 using a pulse current delivered to one of the first terminal 16 or the proximity conductor 18 by the high current switch 52, as directed by one of an operator and a control system (not shown) of the pulse welding system 10.

Prior to application of the pulse current, the first workpiece 12 and the second workpiece 14 are secured between the restraining member 20 and the contacts 32A, 36A of the first terminal 16 and the proximity conductor 18, as shown in FIG. 5. Typically, upon direction by the operator or the control system, the restraining member 20 is moved away from the work surface 24 a predetermined distance that permits the operator or an automated piece of equipment (not shown) to place the second workpiece 14 on the contacts 32A, 36A. The embossed portion 28 of the second workpiece 14 is disposed between the contact 32A, 36A, the embossed portion 28 being substantially parallel and spaced apart from the magnetic field generating portion 40 of the proximity conductor 18. More particularly, the flat portion 26 sits on the contacts 32A, 36A while the embossed portion 28 extends downwardly between the contacts 32A, 36A.

The embossed portion 28 is spaced apart from the magnetic field generating portion 40 of the proximity conductor 18 with the insulator 41; however, it is understood an air gap may provide sufficient insulation. Simultaneously or after positioning of the second workpiece 14, the first workpiece 12 is abuttingly disposed against the substantially flat portion 26 of the second workpiece 14. More particularly, the lower surface 12B of the first workpiece 12 is placed in contact with the flat portion 26 of the upper surface 14A of the second workpiece. As shown in FIG. 5, outer peripheral edges of each of the first workpiece 12 and the second workpiece 14 are aligned; but it is understood that the first workpiece 12 may be positioned in any manner that covers the embossed portion 28 of the second workpiece 14.

Once the first workpiece 12 is disposed against the second workpiece 14 the restraining member 20, upon direction by the operator or the control system, is moved towards the work surface 24 until the restraining member 20 contacts the first workpiece 12. The control system may be configured to apply a predetermined amount of force to the first workpiece 12 with the restraining member 20 or the restraining member 20 may be configured to move a predetermined distance to restrain the first workpiece 12 and the second workpiece 14 between the contacts 32A, 36A and the restraining member 20. Restraining the first workpiece 12 and the second workpiece 14 between the contact 32A, 36A and the restraining member 20 causes the second workpiece 14 to be in electrical communication with the contact 32A of the first terminal 16 and the contact 36A of the proximity conductor 18. More particularly, contact 32A is located in direct physical contact with the lower surface 14B of one end of the second workpiece 14 and contact 36A is located in direct physical contact with the lower surface 14B of an opposite end of the second workpiece 14.

Upon direction by the operator or the control system, the capacitor bank 50 is charged using the inverter 48. Once a predetermined charge level is reached, as determined by the operator or the control system, the high current switch 52 is closed, delivering a pulse current to one of the first terminal 16 and the proximity conductor 18. The pulse current may have a range of amplitude from about 100 kA to about 300 kA. The pulse current travels through the first terminal 16, through the contact 32A, through the second workpiece 14 in a first direction through the contact 36A, and through the proximity conductor 18 in a second direction, as shown by the dashed lines in FIG. 5. The first and second directions are substantially opposite one another.

The pulse current generates one or more magnetic fields between the proximity conductor 18 and the second workpiece 14, causing the rapid acceleration and collision of the embossed portion 28 of the second workpiece 14 with the first workpiece 12. Alternately, it is understood the pulse current may travel through the proximity conductor 18, the second workpiece 14, and through the first terminal 16. Magnetic pulse welding under such conditions may be referred to as "direct magnetic pulse welding," as opposed to "inductive magnetic pulse welding," where a workpiece to be formed does not form a portion of a magnetic pulse circuit.

Figure 6:
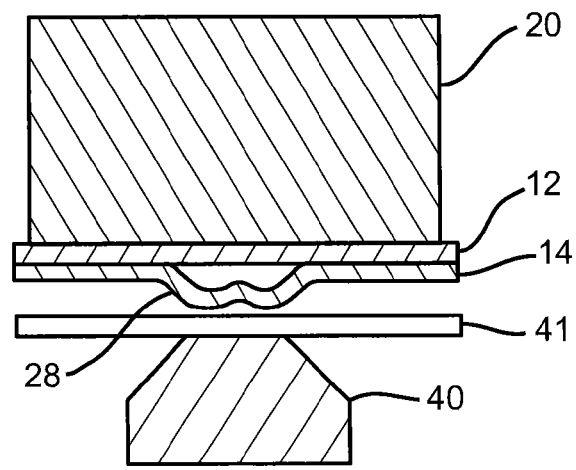
FIG. 6 is a cut-away schematic side view of the system.
Figure 7:
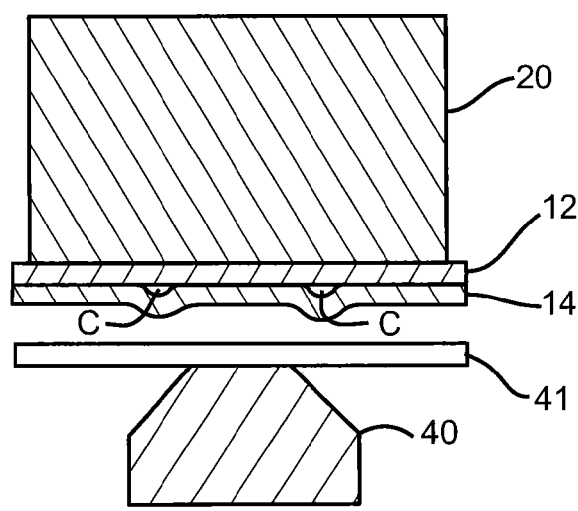
FIG. 7 is a cut-away schematic side view of the system.

As shown in FIG. 6, the magnetic fields cause the embossed portion 28 to begin accelerating at a point closest to the magnetic field generating portion 40, causing the embossed portion 28 to "collapse" inwardly towards the first workpiece 12. The embossed portion 28 "collapsing" inwardly results in at least a portion of the embossed portion 28 to strike the first workpiece 12 at an angle, causing air to evacuate from between the first workpiece 12 and the embossed portion 28 as a cumulative jet. The angle may be from zero to ninety degrees. The cumulative jet removes surface oxides and contaminants from a portion of the first workpiece 12 and the embossed portion 28, which is a condition that facilitates welding the first workpiece 12 to the second workpiece 14. Note, however, that the jet is not required for the present invention to work. Upon impact of the embossed portion 28 and the first workpiece 12, the second workpiece 14 is coupled to the first workpiece 12. A resulting weld joining the first workpiece 12 and the second workpiece 14 is shown in FIG. 7. The entire welded area may be planar, or just a portion of it may be planar.

From FIG. 7, it can be appreciated that channels C may be formed between the first and second workpieces 12, 14. The channels C may be continuous or noncontinuous; they may be parallel or nonparallel; they may be linear or non-linear; they may be in communication with one another or they may be separate from one another. The magnetic field generating portion 40 may be shaped and positioned according to the desired design of the channels C.

At least in part, the acceleration and direction of movement of the embossed portion 28 at an angle is due to the shape of the magnetic field generating portion 40 and may also be due to the location of the portion 40 relative to the embossed portion 28. As depicted in FIGS. 6 and 7, the portion 40 is located under the area of the second workpiece 14 desired to be welded to the first workpiece 12. More particularly, upper surface 44 is located directly under the area desired to be welded. Note that the welded portion in FIG. 7 is somewhat proportional to the width of upper surface 44.

Figure 8:
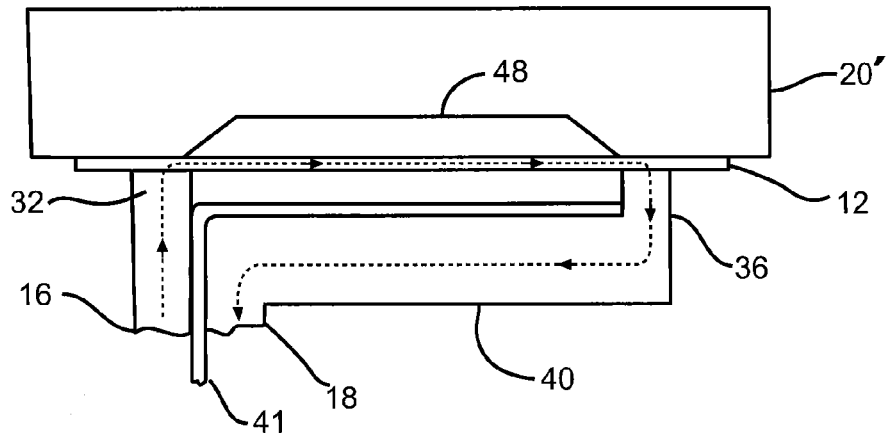
FIG. 8 is a cut-away schematic side view of a pulse forming system.
Figure 9:
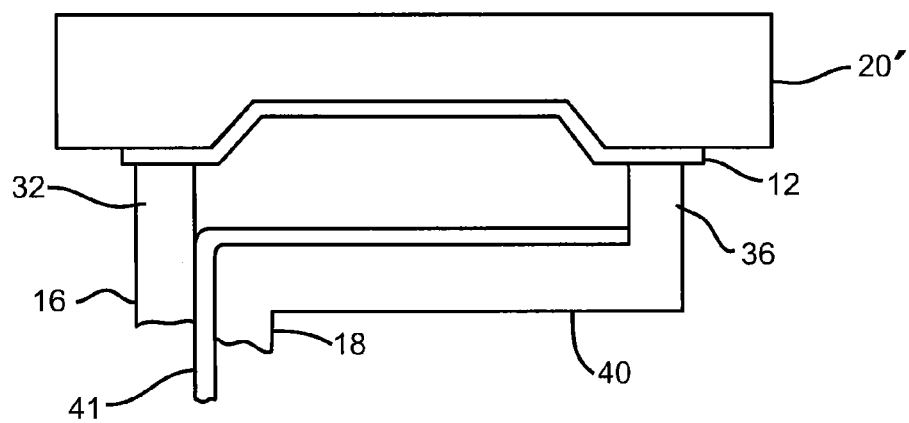
FIG. 9 is a cut-away schematic side view of the pulse forming system of FIG. 8.

FIGS. 8 and 9 show an alternative embodiment to the present invention where like reference numbers discussed above and used in FIGS. 1-7 are used again for like features. FIGS. 8 and 9 depict a magnetic pulse forming method and apparatus.

A restraining member 20' is provided that is the same as the member 20 except that it has a depression 48 formed therein. In FIG. 8, the depression 48 has one shape and size, but the present invention is not limited to the depicted shape or size. Instead, the depression 48 can be any shape or size. Further, the present invention is not limited to depressions. Instead, the member 20' can instead, or in addition, have an outwardly extending portion (not shown). In either case of a depression or outward extension, the shape of the member 20' comprises a shape that is desired for all or part of the first workpiece 12.

The first workpiece 12 may be formed according to the following steps. The restraining member 20', upon direction by the operator or the control system, is moved towards the work surface 24 until the restraining member 20' contacts the first workpiece 12. The control system may be configured to apply a predetermined amount of force to the first workpiece 12 with the restraining member 20' or the restraining member 20 may be configured to move a predetermined distance to restrain the first workpiece 12 between the contacts 32A, 36A and the restraining member 20'. Restraining the first workpiece 12 between the contacts 32A, 36A and the restraining member 20' causes the workpiece 12 to be in electrical communication with the contact 32A of the first terminal 16 and the contact 36A of the proximity conductor 18.

Contact 32A is located in direct physical contact with the lower surface 12B of one end of the first workpiece 12 and contact 36A is located in direct physical contact with the lower surface 12B of an opposite end of the first workpiece 12.

Upon direction by the operator or the control system, the capacitor bank 50 is charged using the inverter 48. Once a predetermined charge level is reached, as determined by the operator or the control system, the high current switch 52 is closed, delivering a pulse current to one of the first terminal 16 and the proximity conductor 18. The pulse current may have a range of amplitude from about 100 kA to about 300 kA. The pulse current travels through the first terminal 16, through the contact 32A, through the first workpiece 12 in a first direction through the contact 36A, and through the proximity conductor 18 in a second direction. The first and second directions are substantially opposite one another.

The pulse current generates one or more magnetic fields between the proximity conductor 18 and the first workpiece 12, causing the rapid acceleration of the first workpiece 12 adjacent the magnetic field generating portion 40 into the depression 48 of the restraining member 20'. The first workpiece 12 takes on the shape of the depression 48, as seen in FIG. 9.

It can be readily appreciated that if the member 20' had an outwardly extending portion, the first workpiece 12 would be similarly formed to comply with the shape of the outwardly extending portion.

Figure 10:
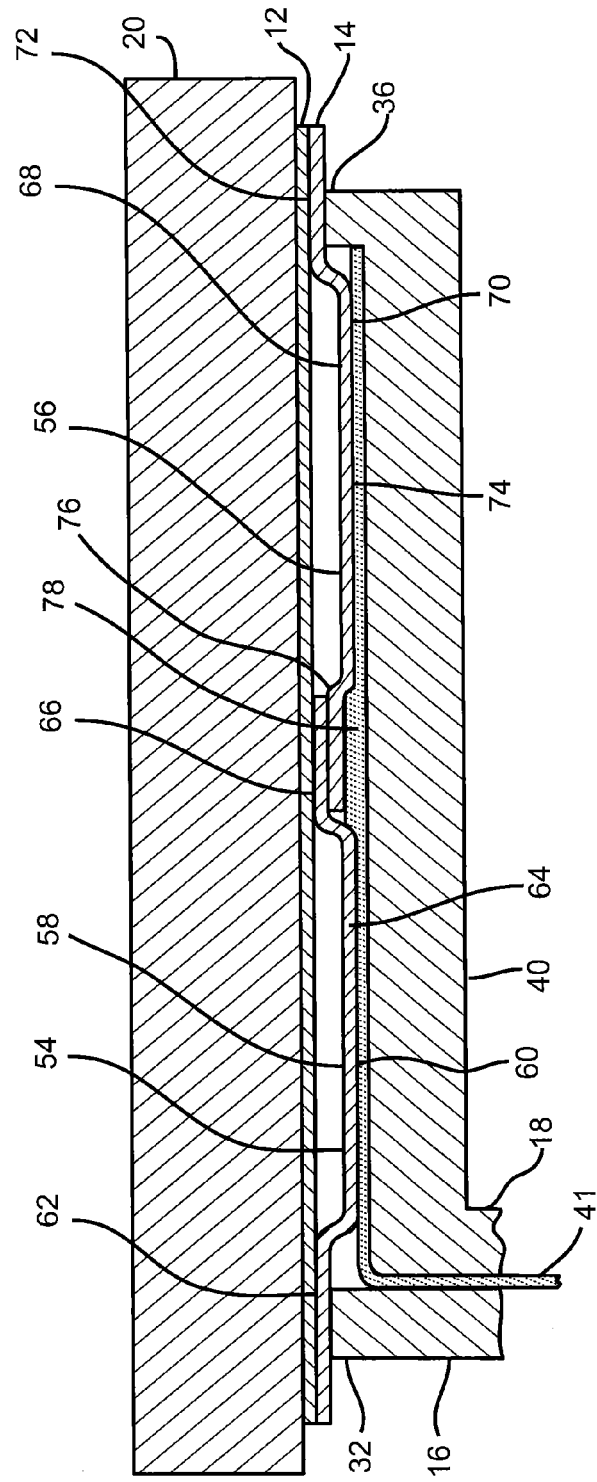
FIG. 10 is a cut-away schematic side view of another embodiment of a pulse welding system.

FIG. 10 depicts another embodiment where the second workpiece, which was previously a single piece, is replaced with two pieces. For clarity, the two pieces of the second workpiece will be designated first flyer 54 and second flyer 56. While two fliers are depicted, it should be appreciated that additional fliers are permissible.

The first flyer 54 has an upper surface 58, a lower surface 60, a planar portion 62 and an embossed portion 64. The planar portion 62, in the present embodiment, surrounds the embossed portion 64. The embossed portion 64 may have the features described above in the prior embodiments of the second workpiece 14. The lower surface 60 may be located in contact with the insulator 41, as shown in FIG. 10.

The second flyer 56 has an upper surface 68, a lower surface 70, a planar portion 72 and an embossed portion 74. The planar portion 72, in the present embodiment, surrounds the embossed portion 74. The embossed portion 74 may have the features described above in the prior embodiments of the second workpiece 14. The lower surface 70 may be located in contact with the insulator 41, as shown in FIG. 10.

The insulator 41 in FIG. 10 extends under the first flyer 54, as well as the second flyer 56. The insulator 41 may have an upstanding portion 78. The upstanding portion 78 may be of any shape, size or location. In the depicted embodiment, the upstanding portion 78 is shaped and located to fit under the overlapped planar portions 62, 72. More particularly, the upstanding portion 78 may match the size, shape and location of the overlapped planar portions 62, 72. The upstanding portion 78 supports and locates the planar portions 62, 72.

Edge portions 66, 76 of the fliers 54, 56, at the upstanding portion 78, may overlap one another such that one lies directly on top of the other. In the depicted embodiment, the first flyer 54 lies on top of the second flier 56, however, a vice versa orientation is also permissible.

The magnetic field generating portion 40 extends beneath the insulator 41. In the depicted embodiment, the portion 40 extends entirely along and beneath the embossed portions 64, 74.

Contact 32 contacts the planar portion 62 of the first flyer 54 and contact 36 contacts the planar portion 72 of the second flyer 56. It can be appreciated from the foregoing that the pulse current flows to contact 32, through flyer 54, through the overlap of flyer 54 to flyer 56, and to contact 36 in a first direction. The pulse current flows through portion 40 in a second direction, opposite the first direction, to create a magnetic field that drives the two embossed portions 64, 74 into the first workpiece 12.

The first workpiece 12 may be one or two pieces, if it is two pieces they may be connected to one another. The first workpiece 12 preferably extends entirely above the first and second fliers 54, 56.

FIG. 11 depicts another embodiment wherein a structure 80 is placed within the embossed area 28 of the second workpiece 14. The structure 80 may be located anywhere within the embossed area 28; it is not limited to the location shown in the figure. The structure 80 may be located in contact with the first and second workpieces 12, 14 as shown in FIG. 11 or the structure 80 may be located in contact with one workpiece. The structure 80 may be such as a tube, but any shape, hollow or not, may be located within the embossed area 28. Further, more than one structure 80 may be located within the embossed area 28. If there is more than one structure 80, they may be in contact with one another or spaced apart from one another. The structures 80 may be straight or they may be curved.

The process described above may be used to move the second workpiece 14 into contact with the first workpiece 12, while the structure 80 is located therebetween. As can be appreciated from FIG. 12, the second workpiece 14 is not only secured, such as welded to the first workpiece, but the second workpiece 14 is also formed around the structure 14. Depending on the structure 80 and the size of the pulse current used, the second workpiece 14 may be welded to the structure 80 or merely formed around it. Regardless, the second workpiece 14 takes on a complimentary shape to the structure 80. In the depicted embodiment, the second workpiece 14 takes on the majority of the shape of the structure 80. This has the advantage of direct thermal contact between the weld and the structure 80. When the structure 80 is such as a heat transfer feature, the resulting thermal transfer between the directly contacting structure 80 and weld is very efficient. The heat removal feature may be such as heating or cooling channels for a fluid to flow therein. The above-described process may be used to form channels, such as fluid channels, between two workpieces 12, 14, such as battery plates.

If the structure 80 and either or both of the first or second workpieces 12, 14 would not normally be paired together due to galvanic corrosion, the structure 80 and the first and/or second workpieces 12, 14 could be isolated from one another by an insulator, such as a dielectric coating.

Figure 13:
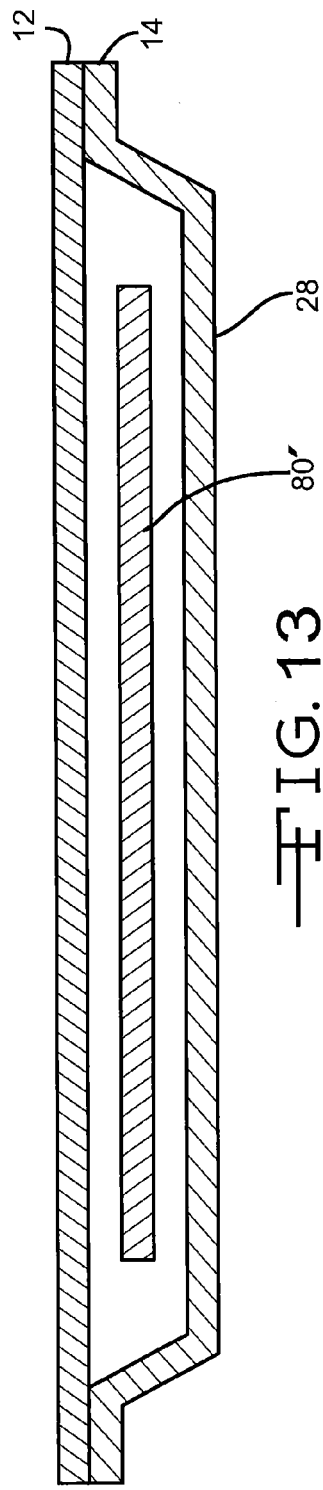
FIG. 13 is a cut-away schematic side view of two plates and a structure in an initial orientation.
Figure 14:
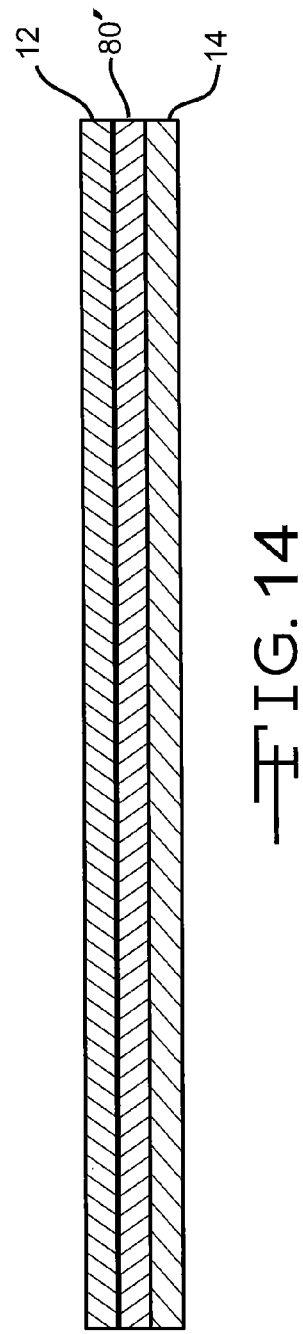
FIG. 14 is a cut-away schematic side view of the plates and structure of FIG. 13 in a subsequent orientation.

FIGS. 13 and 14 depict another embodiment of the present invention where a structure 80' is located in the embossed area 28 of the second workpiece 12. The structure 80' is a flat plate. The flat plate may be a single piece or be comprised of two or more pieces. The flat plate may be comprised of a material that is different from the material of the first workpiece 12 or the second workpiece 14.

A welding process as described above may be used to drive the second workpiece 14, and thus the structure 80', into secure contact with the first workpiece 12, such as by welding each of them to one another. It is also permissible for the second workpiece 14 to be formed about the structure 80' and welded to the first workpiece 12 to secure them together.

Figure 15:
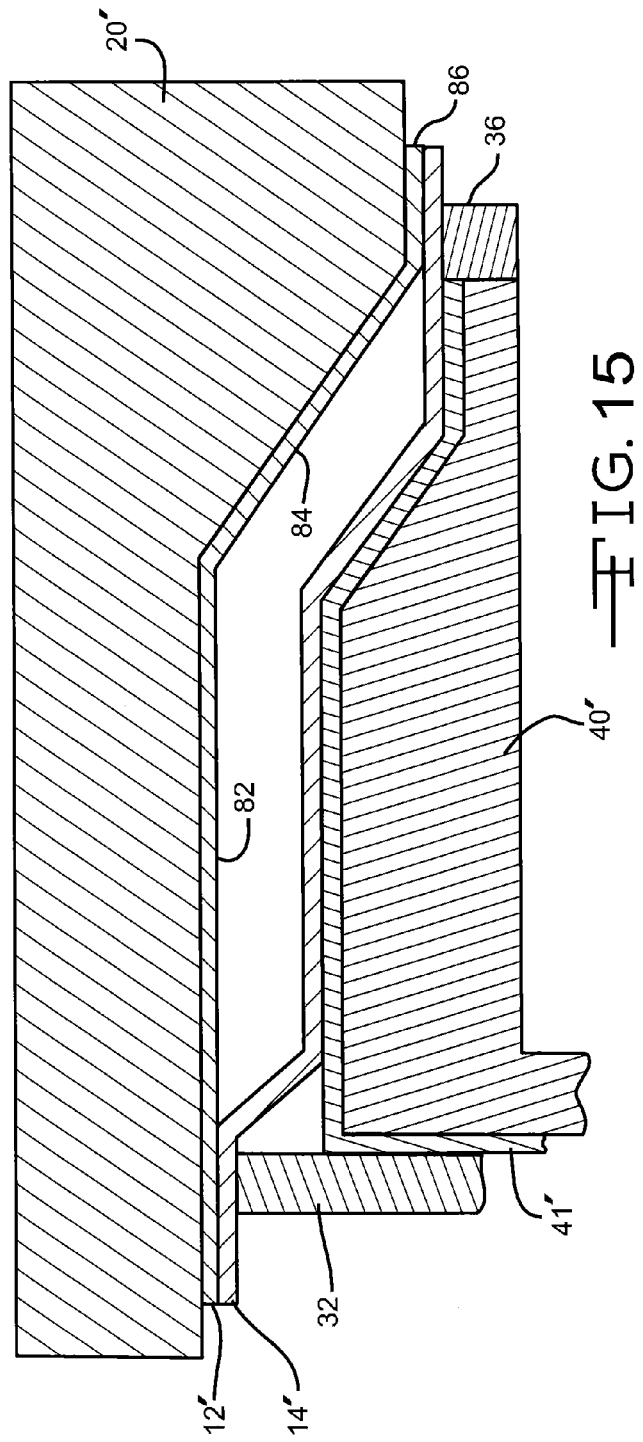
FIG. 15 is a cut-away schematic side view of two plates in an initial orientation.
Figure 16:
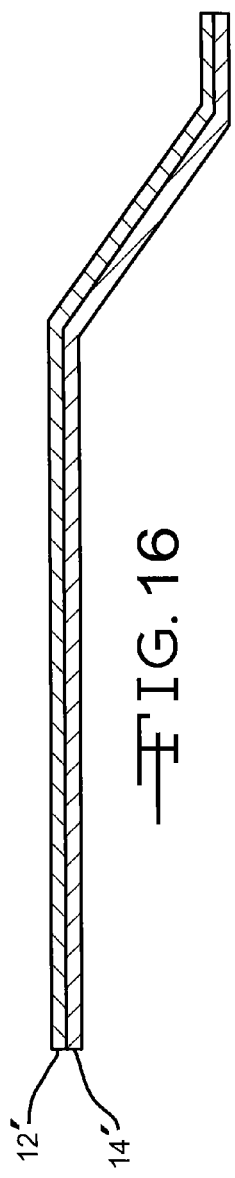
FIG. 16 is a cut-away schematic side view of the plates in a subsequent orientation.

FIGS. 15 and 16 depict another embodiment of the invention with the first workpiece 12' having a non-planar shape. In the depicted embodiment, the first workpiece 12' has a first section 82, a second section 84 and a third section 86. FIGS. 15 and 16 depict the first workpiece 12' in three sections, however, this is merely for exemplary purposes and the present invention is not limited to them. Instead, the first workpiece 12' may be comprised of any number of sections, including just a single, unitary section that has a non-planar shape.

In the depicted embodiment, the first and third sections 82, 86 are depicted as parallel to one another, but they need not be. The second section 84 may connect the first and third sections 82, 86 together. In the depicted embodiment, the second section 84 may be angled with respect to the first and third sections 82, 86. The first workpiece 12' may be supported by a restraining member 20'. The support may come from the restraining member 20' having a shape that is the same as, or that approximates, the first workpiece 12'.

The second workpiece 14' may have a shape that approximates the first workpiece 12', as shown in FIG. 16, or they can be the same. As with the first workpiece 12', the second workpiece 14' may be comprised of more than one section, or a single section.

The contact 32 is located into electrical contact with the first section 82. An insulator 41' is located between the second workpiece 14' and a magnetic field generating portion 40'. The insulator 41' has a shape that approximates the shape of the second workpiece 14' or which may the same. A contact 36 is located in electrical contact with third section 86.

The magnetic field generating portion 40' extends from the contact 36 beneath the insulator 41'. The portion 40' may have a shape complimentary to the shape of the second workpiece 14'.

A pulse current is delivered to contact 32, where it travels through second workpiece 14' and through contact 36. The current travels through the portion 40' in a direction that is opposite, or substantially opposite, its direction through the second workpiece 14'. The opposite direction currents create a magnetic field that drives the second workpiece 14' into the first workpiece 12' to weld them together as shown in FIG. 16. Thus, it can be appreciated that two nonplanar workpieces 12', 14' can be welded together as described above. It should also be appreciated that all of the adjacent surfaces of the workpieces 12', 14' can be welded or just selected sections or areas of the two workpieces 12', 14' can be welded together.

FIGS. 17 and 18 depict another embodiment wherein a sensor 88 is located between the first and second workpieces 12, 14. The sensor 88 can be located anywhere between the workpieces 12, 14, including a welded area or an area that is not welded. In a preferred embodiment, the sensor 88 is located in a weld area 90.

FIG. 17 depicts the sensor 88 located in the weld area 90 where it is substantially centered between the lower surface 12B of the first workpiece 12 and the upper surface 14A of the second workpiece 14. It is permissible, however, to locate the sensor 88 at any location between the two workpieces 12, 14.

FIG. 18 depicts the sensor 88 centered within the weld area 90, however, the sensor 88 does not have to be centered in the area 90. The sensor 88 can be within the weld area 90, partially within the area 90 or entirely out of the weld area 90. Where the sensor 88 is secured by the weld, a secondary step to secure the sensor 88 between the workpieces 12, 14 is not required. Instead, with one-step weld process described above, the sensor 88 is located and secured into the preferred location and orientation.

The sensor 88 may be for any application, such as for acoustics, sound or vibration, chemical, electric, magnetic or radio, moisture or humidity, flow or fluid velocity, position, angle, displacement, distance, speed or acceleration, optical, light or imaging, pressure, force, density, thermal, heat or temperature.

In one embodiment, the sensor 88 may be such as a voltage monitoring sensor that may be used located between the two workpieces 12,14, which may be battery plates. Some sensors, such as voltage monitoring sensors, prefer to remain motionless. By locating a voltage monitoring sensor at least partially in the weld area 90, the sensor remains fixed in position. The sensor 88 may also be such as a thermocouple.

FIGS. 17 and 18 depict a single sensor, however, additional sensors are permissible. The sensors may be the same or they may be of different types.

The figures depict a wire 92 extending from the sensor 88 and through the workpieces 12, 14. The location and orientation of the wire 92 is not limited to what is depicted in the figures. Instead, the wire 92 may extend from any location or orientation and there may be more than one wire.

The wire 92 may be such as a communication wire that permits the sensor 88 to communicate with a data collection device (not shown), such as a computer. Communications may be sent to the sensor 88 along the wire 92, and communications may be sent from the sensor 88 to the data collection device.

Alternatively, or additionally, the sensor 88 may be capable of communicating with the data collection device wirelessly. It can be appreciated that in that instance, a wire may not be required, particularly where the workpieces 12, 14 were comprised of nonmagnetic materials. The sensor 88 can be entirely surrounded by and enclosed within the weld area 90 such that fluid cannot come into or out of the area where the sensor 88 is located.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of welding two workpieces together, comprising:
   providing a first workpiece, the first workpiece being substantially flat;
   providing a second workpiece, the second workpiece having a substantially flat portion and an embossed portion formed therein;
   providing a conductor in electrical communication with a pulse circuit;
   placing the embossed portion of the second workpiece adjacent the conductor, the second workpiece in electrical contact with the pulse circuit and the conductor;
   abuttingly disposing the first workpiece against the substantially flat portion of the second workpiece;
   welding the embossed portion of the second workpiece to the first workpiece by applying the pulse current to the second workpiece;
   restraining the first workpiece and the second workpiece against a restraining member.

2. The method of claim 1, wherein the pulse current travels through the second workpiece in a first direction and the pulse current travels through the conductor in a second direction, the first direction substantially opposite the second direction.

3. The method of claim 1, wherein said embossment has an obround perimeter and a hemispherical shape.

4. The method of claim 1, wherein the flat portion of the second workpiece contacts the first workpiece and the embossed portion extends away from the first workpiece.

5. The method of claim 1, wherein an insulator separates the conductor from the embossed portion of the second workpiece.

6. The method of claim 1, wherein a contact on a first terminal extends upwardly from said first terminal to contact a first end portion of the second workpiece.

7. The method of claim 6, wherein a contact on the conductor extends upwardly from said conductor to contact a second end portion of the second workpiece.

8. The method of claim 7, wherein the workpieces are secured between the restraining member and said contacts.

9. The method of claim 8, wherein the embossed portion is located between said contacts.

10. The method of claim 9, wherein said pulse current is delivered to a contact where it flows through the contact through the second workpiece and through the conductor.

11. The method of claim 10, wherein said pulse current generates a magnetic field between the conductor and the second workpiece, said magnetic field accelerating said embossed portion into welding contact with the first workpiece.

12. The method of claim 11, wherein said magnetic field causes said embossed portion to collapse toward said first workpiece at an angle.

13. The method of claim 1, wherein said pulse current flows from said second workpiece, through the conductor contact, through the conductor beneath the second workpiece.

14. The method of claim 1, wherein said conductor comprises a cantilevered portion that generates a magnetic field affecting said second workpiece, said portion having sides that taper toward said second workpiece.

15. A method of welding workpieces together, comprising:
   providing a first workpiece;
   providing a second workpiece, the second workpiece having an embossed portion formed therein;
   placing the first workpiece against the second workpiece so that the embossed portion extends from the first workpiece;
   placing the embossed portion adjacent a conductor;
   welding the embossed portion of the second workpiece to the first workpiece by applying a pulse current through the embossed portion;
   restraining the first workpiece and the second workpiece against a restraining member.

16. The method of claim 15, wherein said conductor comprises a cantilevered magnetic field generating portion that is shaped to form a magnetic field that welds the embossed portion into the first workpiece.

17. The method of claim 16, wherein said magnetic field generating portion receives said pulse current after said current extends through said second workpiece.

18. The method of claim 15, wherein said magnetic field generating portion extends across said conductor and has an upstanding contact to receive said pulse current from an end of said second workpiece.

19. The method of claim 18, wherein said embossed portion is located between said contact on said magnetic pulse generating portion and a first terminal contact.

20. The method of claim 15, wherein said first workpiece is located opposite said second workpiece.

21. The method of claim 15, further comprising a third workpiece in electrical communication with the second workpiece.

22. The method of claim 21, further comprising a magnetic field generating portion that extends beneath said second and third workpieces.

23. The method of claim 15, further comprising locating a structure between said first and second workpieces so that said second workpiece is welded to said first workpiece and located about said structure.

24. The method of claim 23, wherein said structure is a tube for conveying a fluid.

25. The method of claim 23, wherein said structure is a sensor selected from the group of a thermocouple sensor, a voltage sensor, and a temperature sensor.

26. A method of forming a workpiece, comprising:
   providing a first workpiece;
   placing the first workpiece in direct contact a first electrical contact and placing the first workpiece in direct contact with a second electrical contact, said second electrical contact in electrical communication with a magnetic field generating portion;
   applying a pulse current through said first electrical contact to travel through said first workpiece in a first direction to said second electrical contact;
   creating a magnetic field by routing said pulse current in a second direction, opposite said first through said magnetic field generating portion;
   forming said first workpiece into at least a portion of a restraining member located adjacent said first workpiece;
   restraining the first workpiece and the second workpiece against said restraining member.

27. A method of attaching two workpieces, comprising:
   providing a first non-planar workpiece;
   providing a second non-planar workpiece;
   locating a restraining member adjacent said first workpiece and said second workpiece to restrain said workpieces, said restraining member having a complimentary shape to said first workpiece;
   locating a magnetic field generating portion adjacent said second workpiece, said magnetic field generating portion having a complimentary shape to said second workpiece;
   positioning an insulator between said magnetic field generating portion and said second workpiece;
   providing a first contact for delivering a pulse current through said second workpiece to a second contact in a first direction, said pulse current extending through said magnetic field generating portion in a second direction, opposite said first direction, to develop a magnetic field that drives said second workpiece into welded contact with at least a portion of said first workpiece.

\* \* \* \* \*